July 4, 1961 J. ROSS 2,991,331

STATIC ELECTRICITY ELIMINATOR AND CONDITIONER FOR PHONOGRAPH RECORD DISCS

Filed Feb. 28, 1956

INVENTOR

JAMES ROSS

BY Francis J. Klempay

ATTORNEY 2,991,331

STATIC ELECTRICITY ELIMINATOR AND CONDITIONER FOR PHONOGRAPH RECORD DISCS

James Ross, Youngstown, Ohio, assignor to The Astatic Corporation, Conneaut, Ohio, a corporation of Ohio Filed Feb. 28, 1956, Ser. No. 568,358
2 Claims. (Cl. 179—100.41)

The present invention relates in general to the art of phonographic sound reproduction and more particularly to the elimination of static electricity charges and the conditioning of record media in sound reproduction systems. In this particular art, it is customary to reproduce sound from record discs which are made from various organic material such as wax, shellac, rubber, or numerous plastic polymers, for example. Record discs made from plastic materials have enjoyed wide spread acceptance in the past several years as they are well suited for "microgroove" recordings and are well adapted for high fidelity reproduction.

Although this type of disc has been found to be particularly well adapted for use in the recording art, there are two serious defects resulting from the generation of static electricity charges on the record disc surface. These charges are the result of handling the record discs, i.e. putting them into and removing them from paper or cardboard jackets, dusting prior to playing, etc., and the normal friction which occurs between the record engaging stylus and the surface of the record disc. The charge on the surface of a record disc, due to the well known electrophoric effect, has the property of attracting dust particles to the record disc surface and holding them there. The particles thus held are pressed into the relatively soft material of the record by the passing stylus when it is played and severe wear to both the stylus and the record results. This seriously curtails the average life of a record disc and stylus as should be readily apparent.

In addition, as the record is being played, a static charge of electricity is being continually built up and if the potential of the static charge on the record disc exceeds the resistance drop of the discharge path to the player cartridge, a discharge will occur. This results in a very audible "pop" in the speaker of the reproducing system which is extremely undesirable. Charges in the order of eight volts have been measured with an electrometer on the surface of a record disc and, in dry weather, the discharge or "pop" will occur a dozen or more times during the playing of a single record disc side.

It is therefore the primary object of the invention to provide a record playing cartridge for use in phonograph systems which is equipped with means to eliminate and neutralize the charge of static electricity collected on the surface of a record disc. In this manner the audible "pops" are completely eliminated.

It is yet another object of the invention to provide a record playing cartridge having static eliminating means whereby the records played thereby are electrically passive after playing. This allows the storage of records in a relatively dust-free condition since dust particles and other fine material is not attracted to or held on the surface of the record disc.

A further object of the invention is to teach the construction and assembly of a cartridge unit having a radioactive source for emitting alpha radiation to neutralize and eliminate any generated or residual charges of static electricity. It has been found that a substance which emits alpha radiation may be used to counteract the formation of static charges since the radiation rapidly ionizes the air thereby absorbing the static charges generated. Such a technique has been successfully employed in the textile and printing arts where it is necessary to make sheets or strips of material electrically passive for purposes of staking, folding, winding, etc. It should be understood however that many problems are encountered in the use of alpha emitting radiation substances and my invention is directed to the application of such techniques to the phonograph sound reproducing art.

An important ancillary object and advantage of the invention is means for mounting the radioactive source whereby the same is protected from unauthorized handling by the operator. Since raw radioactive materials present a considerable safety problem, I propose and prefer to utilize a foil-covered source of alpha radiation such as that disclosed in the U.S. Patent No. 2,479,882 to Wallhausen et al., for example. In the record playing cartridges of the present invention, such a source is mounted on the underside of the cartridge in a recess. This substantially eliminates any possibility of unauthorized handling as will become more readily apparent.

The above, as well as numerous other objects and advantages of the invention, will become apparent upon consideration of the following detailed specification and accompanying drawing wherein is disclosed several preferred embodiments of my invention.

Figure 1:
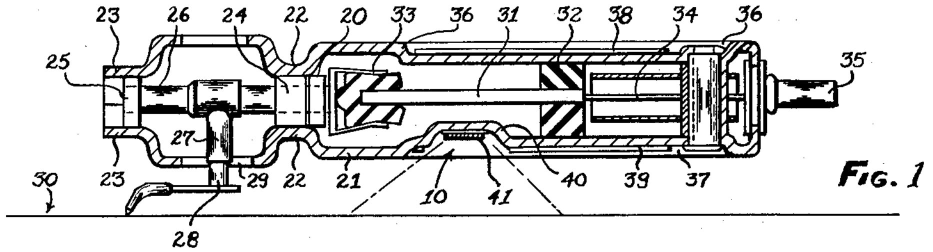
FIGURE 1 is a longitudinal sectional view of a record playing cartridge of my invention.

Referring now to the drawing, the reference numeral 10 is used in all views to designate the general assembly of the radio-active emissive sources of the invention, the construction of which will be hereinafter more fully explained.

Figures 2, 3, 4, 5:
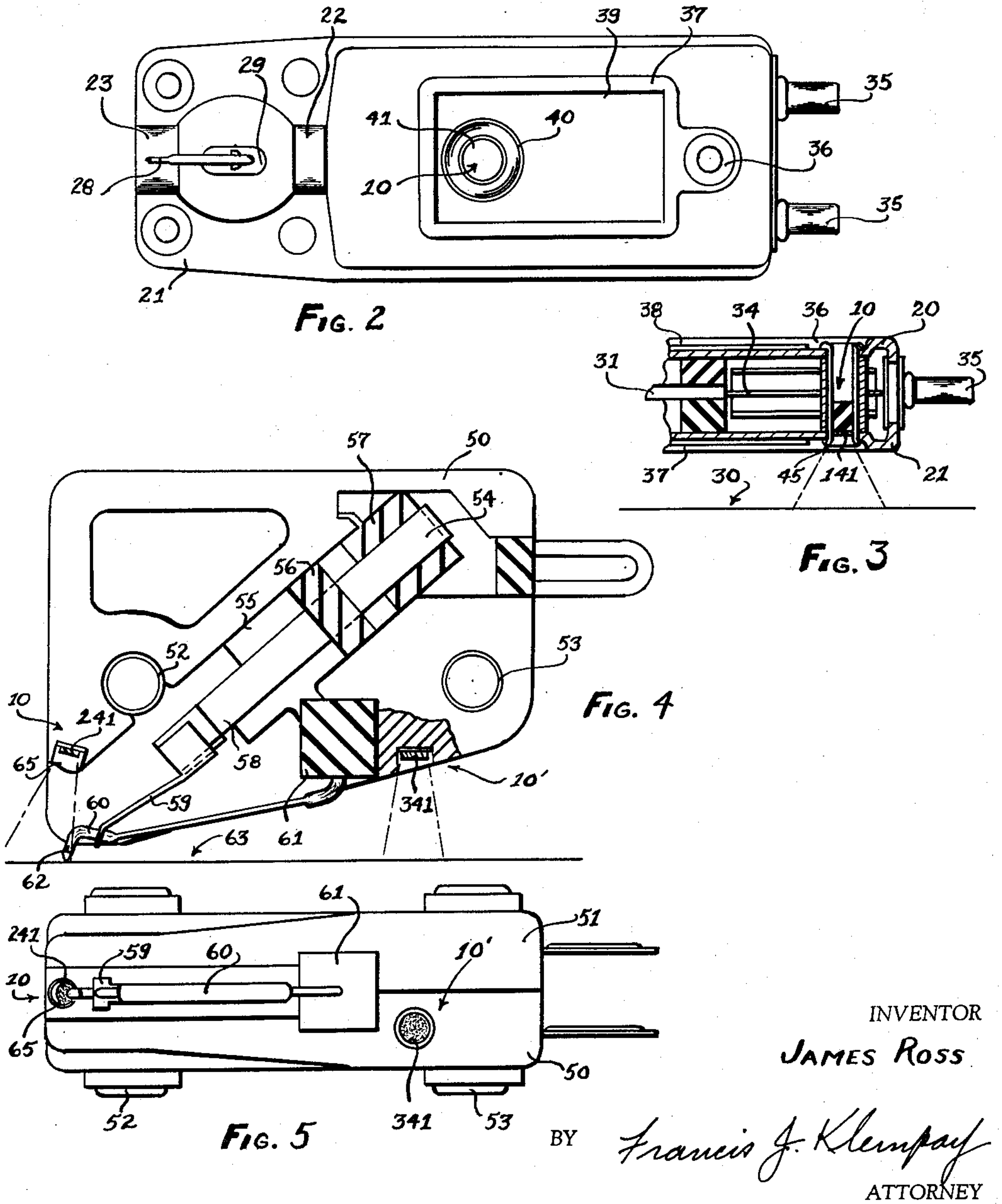
FIGURE 2 is a plan view of the underside of the cartridge depicted in FIGURE 1.
FIGURE 3 is a sectional view similar to a portion of FIGURE 1 showing a second embodiment of my invention.
FIGURE 4 is a longitudinal sectional view of yet another cartridge constructed in accordance with the teachings of the present invention.
FIGURE 5 is a plan view of the underside of the cartridge shown in FIGURE 4.

In FIGURES 1 and 2 of the drawing there is illustrated an assembled record playing cartridge constructed in accordance with the teachings of my invention comprising a casing formed from two stamped metal housing halves 20 and 21, forming the upper and lower halves of the housing respectively. At the forward end of the housing halves there are provided the depressed areas 22 and 23 which are adapted to receive tubular rubber bearings 24 and 25, respectively. Journaled in the rubber bearings 24 and 25 is a crystal driving chuck 26 and extending radially therefrom I provide a needle securing sleeve 27. The sleeve 27 is adapted to slidably receive a needle assembly 28 which is preferably of the type disclosed in Patent No. 2,601,988 of C. M. Chorpening et al. and assigned to the assignee of the present invention. The needle assembly 28 protrudes through the aperture 29 in the lower housing half 21 and extends longitudinally with the housing and has a downturned end portion thereof adapted to engage and bear on the surface 30 of a record disc in a well known manner.

Mounted inside the large cavity in the rear of the housing is a piezoelectric transducer 31 which serves to translate mechanical vibrations of the needle assembly 28 into electrical impulses. The transducer 31 is firmly clamped between clamp pads 32 on its rear end and is resiliently clamped on its forward end in the drive clamp 33. Clamp 33 is mechanically affixed to an end of the driving chuck 26 and consequently is conditioned to impart to the transducer 31 vibrations which come from the needle assembly 28. The vibrations are transformed into electrical impulses by the transducer 31 which are conducted via a pair of foil leads 34 to the terminal pins 35, all in a well known manner. The various parts thus far described are held together in assembled relation by a tubular rivet 36.

In the relatively large area of the major face portions of the housing halves 20 and 21 I form the depressed areas 36 and 37, respectively, both having substantial area. These depressions act to stiffen the relatively thin metal walls of housing halves 20 and 21 and also offer a convenient place for the mounting of instruction labels 38 and 39 or other like indicia.

In accordance with the teachings of the present invention I provide a further depression 40 in the lower depressed area 37 of predetermined shape and depth. Attached to the bottom wall of the depression 40 is a source 41 of alpha particle radiation. This is preferably a piece of metal foil containing suitable radioactive material, such as described in the above identified patent to Wallhausen et al., although any other like radioactive material may be successfully employed. The location, size, and depth of depression 40 determines the effectiveness of the static eliminator of my invention. The properties of alpha radiation are such that the same is readily absorbed by any homogeneous or relatively dense matter, i.e. alpha radiation has low penetrating power, and for this reason there must be an unobstructed path from the source 41 to the surface of the record disc 30. In addition, this characteristic of alpha radiation dictates that the source 41 must be relatively close to the record disc 30, the maximum allowable separation being on the order of one inch. Since the penetrating power of the alpha radiation is very low, the shape of the depression 40 will determine the area covered by the radiation from the source 41. In this manner the radiation can be limited or directed to a specific area of the record disc in order to produce the best results. In FIGURE 1 the approximate width of the cone of radiation is indicated by the broken lines.

In actual tests, I have found, for example, that a .25 microcurie source located as shown in the drawing with respect to the record disc surface 30 will adequately neutralize static charges in an effective area immediately adjacent the tip of the needle assembly 28 and will completely offset the effect of charges of the observed magnitude of eight volts. Attention is drawn to the important fact that the relative small size of the source 41 and the positioning of the depression 40 in the bottom surface of the lower housing halve 21 is such that it renders the same safe from accidental handling by the operator.

In the modification of the invention shown in FIGURE 3 of the drawing, the radioactive element 141 is mounted in the tubular rivet 36. By inserting a cylindrical rubber plug 45 in the tubular rivet 36 and then attaching the source 141 to one face of the plug 45, a cartridge with a static eliminator is obtained. It will be evident that the depth of the insertion of the plug will control the area of effective radiation on the record disc surface 30 and the approximate effect is shown by the broken lines for the position illustrated. It is also noted that this adaptation serves as an excellent means for converting existing record playing cartridges of this general construction and assemblage to a cartridge making use of a source of alpha radiation for static elimination and record conditioning.

FIGURES 4 and 5 show yet another embodiment of the invention wherein I have utilized the basic structure of another type of record playing cartridge in carrying out my invention. This structure corresponds generally to that disclosed in U.S. Patent No. 2,575,999 to Cordes and assigned to the assignee of the present invention.

A pair of molded plastic housing halves 50 and 51 are secured together by a pair of rivets 52 and 53 to form the body of the cartridge. A ceramic transducer 54 is supported between the housing halves 50 and 51 by the rubber clamp pads 55, 56, and 57. The transducer element 54 operates as a cantilever beam and has its lower end 58 freely disposed but attached to a nose piece 59, the free end of which rests on the needle 60. One end of the needle 60 is anchored to the housing through the medium of the rubber block 61 while the pointed free end 62 engages the surface 63 of a record disc.

Forwardly of the nose piece 59 and above the forward tip of the needle 62 between the housing halves 50 and 51 there is formed a cylindrical bore 65. The bore 65 may have its axis inclined forwardly as shown and may also be of any desired shape depending on the alpha radiation desired, as for example, being frustro-conical in shape. A foil coated source 241 of radioactive material is attached in the bore 65 with its active surface disposed in a direction toward needle 60 with the cone of radiation depicted by the broken lines.

The above described arrangement affords a safe, obscure location for the source 241 while maintaining the same in efficient relation with respect to the needle 60. In conditions where space does not permit the above described placement of parts, an alternate location 10' may be selected for placement of the radioactive source 341 in the cartridge. In either case, the parameters of bore size, distance from the record surface, and strength of the source must be kept in mind and varied according to the results desired.

It should be thus apparent that I have accomplished the objects initially set forth by providing a record playing cartridge embodying an alpha radiation source which serves as a static electricity eliminator and conditioner for phonograph record discs. As the needle rides in the grooves of the record disc the radioactive source emits alpha radiation which is directed at a point closely adjacent the tip of the needle thereby covering the entire surface of the record and dissipating any static electricity thereon. In this manner audible "pops" are entirely eliminated and record life is increased appreciably since the record has much less tendency to collect dust and other fine particles. The radioactive source of the cartridge assembly is adequately and safely concealed therein thus making the operation thereof completely safe. Records once played with this type of cartridge are electrically passive and in excellent condition for dust-free storage.

It should be obvious that many changes may be made in my invention without departing from the teachings thereof. Reference should therefore be had to the following appended claims in determining the full scope of the invention.

I claim:

1. A replaceable phonograph pickup cartridge of the type adapted to be removably mounted in the underside and the outer free end of a channel-shaped phonograph tone arm for use in playing flat record discs and the like which comprises a housing, said housing having a cavity therein, an electro-mechanical transducer element mounted in said cavity, a stylus assembly comprising a groove engaging tip adapted to engage the groove of a record disc, means drivingly interconnecting said stylus assembly and said electro-mechanical transducer element, said housing having an integral inwardly extending recess therein on a surface thereof closely adjacent said record disc when said phonograph pickup cartridge is removably mounted in said tone arm and is in operative relation with said record disc, a source of alpha particle radiation directly and permanently mounted completely within the confines of said recess, said source of alpha particle radiation being shielded in all directions by the side walls of said recess and said tone arm except in a direction toward said record disc when said phonograph pickup cartridge is removably mounted in said tone arm and is in operative relation with said record disc to provide an unobstructed and short path of radiation to said record disc, and the depth and shape of said recess determining the area of said record disc covered by said radiation from said source of alpha particle radiation.

2. Apparatus according to claim 1 further characterized in that said housing comprises a pair of housing halves, means securing said housing halves together, said means securing comprising a hollow tubular rivet joining said housing halves, a plug tightly and frictionally received within said hollow tubular rivet, one end surface of said plug and the internal side walls of said hollow tubular rivet defining said recess, and said source of alpha particle radiation being mounted directly and permanently on said one end surface of said plug.

References Cited in the file of this patent

UNITED STATES PATENTS

| | | |
|---|---|---|
| 2,048,490 | Bilstein | July 21, 1936 |
| 2,300,923 | Hornor | Nov. 3, 1942 |
| 2,313,126 | Dally | Mar. 9, 1943 |
| 2,373,960 | Huenlich | Apr. 17, 1945 |
| 2,479,882 | Wallhausen et al. | Aug. 23, 1949 |
| 2,575,999 | Cordes | Nov. 20, 1951 |
| 2,595,226 | Cookson | May 6, 1952 |
| 2,601,988 | Chorpenning et al. | July 1, 1952 |

OTHER REFERENCES

"New Products" (Record-Static Eliminator), as found on page 50 of Audio, June 1954.